(12) United States Patent
Carbone

(10) Patent No.: US 9,321,428 B2
(45) Date of Patent: Apr. 26, 2016

(54) VEHICLE SEAT PROVIDED WITH COMPACT FAST-INSTALLING SAFETY BELT SYSTEM

(71) Applicant: LAZZERINI SOCIETA 'A RESPONSABILITA' LIMITATA, Monsano (IT)

(72) Inventor: Innocenzo Salvatore Carbone, Santa Maria Nuova (IT)

(73) Assignee: LAZZERINI SOCIETA 'A RESPONSABILITA' LIMITATA, Monsano (AN) (IT)

( * ) Notice: Subject to any disclaimer, the term of this patent is extended or adjusted under 35 U.S.C. 154(b) by 0 days.

(21) Appl. No.: 14/385,923

(22) PCT Filed: Mar. 18, 2013

(86) PCT No.: PCT/EP2013/055577
§ 371 (c)(1),
(2) Date: Sep. 17, 2014

(87) PCT Pub. No.: WO2013/139742
PCT Pub. Date: Sep. 26, 2013

(65) Prior Publication Data
US 2015/0097410 A1   Apr. 9, 2015

(30) Foreign Application Priority Data
Mar. 19, 2012   (IT) .......................... AN2012A000026

(51) Int. Cl.
| B60R 22/26 | (2006.01) |
| B60R 22/195 | (2006.01) |
| B60R 22/20 | (2006.01) |
| B60N 2/68 | (2006.01) |
| B60R 22/02 | (2006.01) |
| B60R 22/18 | (2006.01) |

(52) U.S. Cl.
CPC ................ *B60R 22/26* (2013.01); *B60N 2/688* (2013.01); *B60R 22/023* (2013.01); *B60R 22/18* (2013.01); *B60R 22/195* (2013.01); *B60R 22/20* (2013.01); *B60R 2022/1818* (2013.01)

(58) Field of Classification Search
CPC ...... B60R 22/26; B60R 22/195; B60R 22/18; B60R 22/023; B60R 22/20; B60R 2/688; B60R 2022/1818
See application file for complete search history.

(56) References Cited

U.S. PATENT DOCUMENTS

| 3,810,657 A * | 5/1974 | Campbell | ............. B60R 22/022 |
| | | | 280/808 |
| 4,508,362 A * | 4/1985 | Higuchi | .................. B60R 22/04 |
| | | | 280/802 |
| 6,234,529 B1 * | 5/2001 | Ellison | .................... B60R 22/24 |
| | | | 280/808 |

(Continued)

FOREIGN PATENT DOCUMENTS

EP           0215220 A1     3/1987

(Continued)

OTHER PUBLICATIONS

International Search Report and Written Opinion for PCT/EP2013/055577, 2013-2014 (9 pages).*

*Primary Examiner* — Rodney Mintz
(74) *Attorney, Agent, or Firm* — Egbert Law Offices, PLLC

(57) ABSTRACT

A vehicle seat is provided with a safety belt system having compact size and rapid installation, which can be preassembled and installed simultaneously with the framework of the seat-back.

8 Claims, 4 Drawing Sheets

(56) References Cited

U.S. PATENT DOCUMENTS

| | | |
|---|---|---|
| 6,585,325 B1 | 7/2003 | Pal |
| 2015/0353050 A1* | 12/2015 | Han .................. B60N 2/42 297/217.2 |
| 2015/0367813 A1* | 12/2015 | Ballarin ............. B60N 2/50 280/805 |

FOREIGN PATENT DOCUMENTS

| | | | |
|---|---|---|---|
| EP | 0374893 A2 | 6/1990 | |
| EP | 1731385 A1 * | 12/2006 | ............ B60R 22/26 |
| EP | 2258591 A2 | 12/2010 | |
| WO | WO 2005087551 A1 * | 9/2005 | ............ B60R 22/26 |

\* cited by examiner

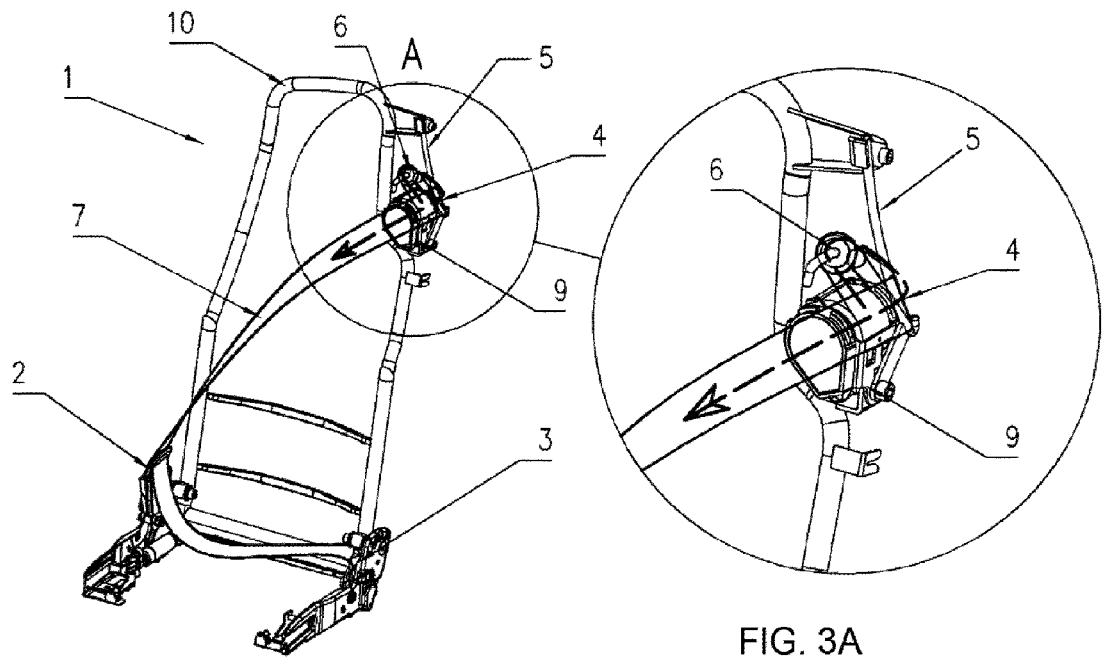
FIG. 3
FIG. 3A
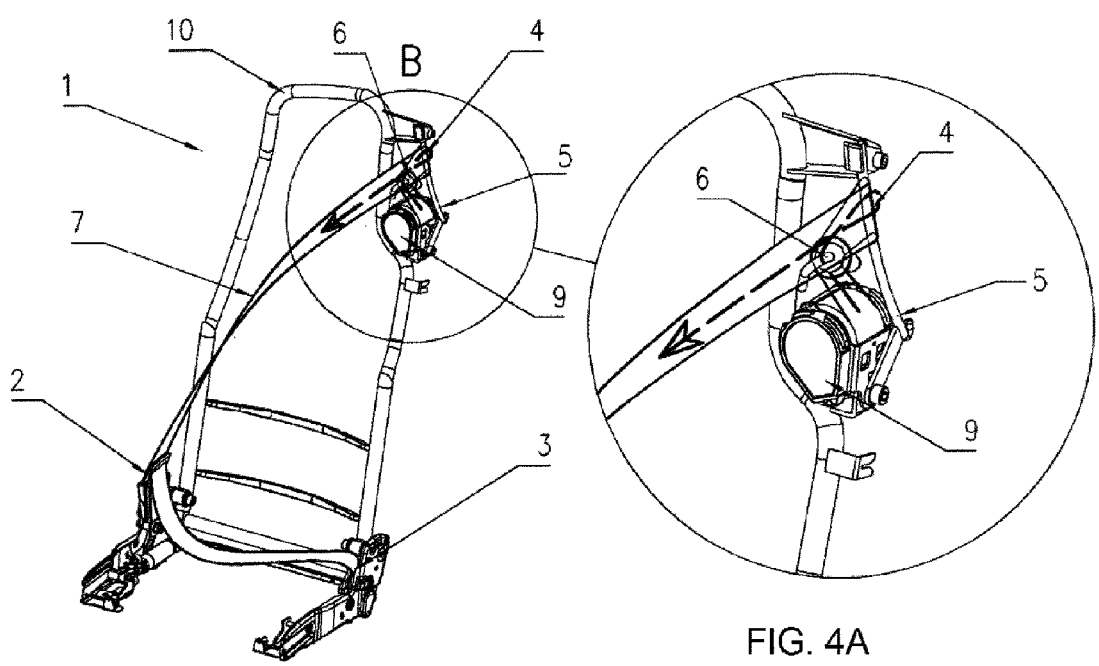
FIG. 4
FIG. 4A

VEHICLE SEAT PROVIDED WITH COMPACT FAST-INSTALLING SAFETY BELT SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a vehicle seat provided with compact fast-installing safety belt system.

The seat of the invention has been designed to overcome the drawbacks of the safety belt systems with self-adjustable height of the prior art that are embedded in the back of the seat.

More precisely, these seats have been designed to avoid positioning the recoil and restraint system of the safety belt in an external fixed framework, as it normally occurs in the majority of vehicles in which the entire system is anchored to the vehicle framework.

In particular, said seats have been particularly designed for coaches or buses in which seats are mounted in multiple rows and are not always provided with a fixed wall adapted to house the recoil and/or restraint systems of the safety belts.

Therefore the present invention falls within the sector of seats that embed guiding systems for seat belts with self-adjustable height in the back of the seat, which are able to adjust to the occupant's body size, and especially, height.

In fact, the guiding system for safety belts according to the invention is of three-point type (e.g. traditional system of car vehicles on the market), it being provided with two lower anchor points located on the two sides of the seat, and with a third deflection point located at the height of the occupant's shoulder.

Said third deflection point must be provided with a height adjustment device adapted to redirect the seat belt from one of the lower anchor points to the recoil and restraint device.

2. Description of Related Art Including Information Disclosed Under 37 CFR 1.97 and 37 CFR 1.98

The description of the prior art continues with reference to the EP1731385 patent registered on 03.03.2006 by FUNDACION INST TECHNO PARA SEG [ES] and claiming the priority of the Spanish patent application ES200400618 filed on Dec. 3, 2004.

The prior art is described with reference to FIG. 1, which is a schematic view of a guiding system for safety belts as described and claimed in the EP1731385 patent.

With reference to FIG. 1, the guiding system for safety belts comprises two lower anchor points (2 and 3), located on the two sides of a seat (1) and a deflection point (4) located at the height of the occupant's shoulder; said deflection point (4) is provided with a height adjustment device (5) adapted to redirect the belt web (7) from one of said lower anchor points (2 or 3) to a recoil and restraint device (9) that keeps the belt web (7) tight in normal conditions.

Said belt web (7) is diagonally positioned across the occupant's chest between the deflection point (4) and one of the lower anchor points (2 or 3) and is transversally positioned onto the lower part of the occupant's body between the lower anchor points (2 or 3).

The height adjustment device (5) of the deflection point (4) comprises sliding means (8) that are fixed to the vehicle bodyworks or to the relevant side of the vehicle seat and allow for freely positioning of the belt web (7) diagonally across the occupant's chest.

The innovative characteristic of said device was the provision of a second deflection point (6) fixed and arranged behind the vehicle occupant (10).

Moreover, means (8) are provided to allow freely displacement of the deflection point (4) of the safety belt web (7), redirecting the belt web (7) from a variable height that is automatically adjustable to the occupant's needs to the opposite side of the seat and to the second deflection point (6) wherefrom the belt web (7) is redirected to the supply and restraint device (9).

The first drawback of the system disclosed and claimed in the EP1731385 patent refers to the length of the belt web (7).

Being the recoil and restraint device (9) located in the lower part of the seat (1)—on the opposite side with respect to the deflection point (4)—said belt web is provided with a substantially vertical section (Y) going from the recoil and restraint device (9) to the deflection point (6) and a second substantially horizontal section (X) going from the deflection point (6) to the height adjustment device (5) of the deflection point (4).

Said first (Y) and second section (X) of the belt affect the total length of the belt web (7) and the size of the recoil and restraint device (9).

It must be noted that the cost of the entire system also depends on the total length of the belt web and on the dimensions of the recoil and restraint device (9).

Moreover, safety belts with insufficient length may be inappropriate for tall or heavily-built passengers.

The second drawback consists in the fact that, being said recoil and restraint device (9) located in the lower part of the seat-back and precisely on the seat, the total thickness of the seat-back is increased in a prominent point.

In fact, when the volume of the lower part of the seat-back increases, the distance between the front seat and the back seat must be modified in order to maintain the level of comfort unchanged for the passenger sitting on the back seat.

More precisely, said level of comfort depends on the distance between the seat of the back seat and the back side of the seat-back of the front seat, given the fact that the leg position of the passenger sitting on the back seat exclusively depends on said distance.

The EP 0 215 220 patent discloses a safety belt system comprising:
- a first deflection point provided with height adjustment device, both being located on the side of the seat, in correspondence of the occupant's left shoulder;
- a recoil device located behind the seat, in correspondence of the occupant's left shoulder; and
- a second deflection point located behind the seat, in correspondence of the occupant's left shoulder, between the recoil device and the first deflection point.

Therefore the first deflection point, the height adjustment device, the second deflection point and the recoil device are all located on the same side with respect to the occupant.

However the second deflection point consists in a "C"-shaped curved plate and the recoil axis of the recoil device is parallel to the plane of the seat-back. The structure and arrangement of the second deflection point and recoil device result in the additional extension of the belt and a high sliding friction, with the possibility that, when recoiling the belt, the belt section between the second deflection point and the recoil device may get twisted and blocked, thus jeopardizing belt operation and consequently passenger's safety.

BRIEF SUMMARY OF THE INVENTION

The purpose of the present invention is to devise a seat that embeds a guiding system for safety belts with automatic height adjustment, which is exempt from the aforementioned drawbacks.

An additional purpose of the present invention is to disclose a seat provided with a safety belt system with automatic height adjustment that, apart from meeting the aforesaid purpose, does not comprise the sliding means of the prior art consisting in a slide mounted on tracks.

In addition to reducing the total weight of the seat, the elimination of said sliding means results in a series of advantages in terms of costs, both in terms of purchasing and maintenance costs. Attention must be drawn on the fact that the correct automatic height adjustment of the safety belt depends on the operation of said sliding means.

Moreover, it must be noted that said sliding means need lubrication and that, in case of wear, the passenger must move them indirectly and manually (either upwards or downwards) actuating on the safety belt, in view of the fact that the sliding means are located inside the seat for evident aesthetic reasons.

The peculiarity of the seat of the invention is that the safety belt system is provided with recoil and restraint device, first deflection point, second deflection point and height adjustment device on the same side of the seat-back.

Therefore these parts are all arranged on the side of the seat-back, thus remedying all aforesaid drawbacks.

As shown in the description below, the height adjustment device is composed of a curved vertical rod that comprises means for fixing to the framework of the seat-back, said fixing means also comprising all parts of the safety belt system, thus providing a compact device characterized by fast installation.

In fact, all parts of the system can be pre-assembled and installed simultaneously by screwing said curved vertical rod onto the framework of the seat-back.

Moreover, the safety belt system of the invention comprises a second deflection point with axis orthogonal to the plane of the seat-back and a recoil device with recoil axis orthogonal to the plane of the seat-back. The structure and arrangement of the second deflection point and recoil device allow for reducing the length of the belt as much as possible, thus minimizing the sliding friction of the belt and preventing the belt from getting twisted and blocked, jeopardizing the passenger's safety.

BRIEF DESCRIPTION OF THE SEVERAL VIEWS OF THE DRAWINGS

For explanatory purposes the description of the seat according to the invention continues with reference to the attached drawings, which only have an illustrative, not limiting value, wherein:

FIGS. 3 and 4 are two axonometric views of the seat of the invention with safety belt in operating condition in two different positions, the first one adapted to be fastened around a short passenger, and the second one around a tall passenger;

FIGS. 3A and 4A are two enlarged views of FIGS. 3 and 4, respectively, which show the safety belt (7) and the height adjustment device (5)

DETAILED DESCRIPTION OF THE INVENTION

Figure 1:
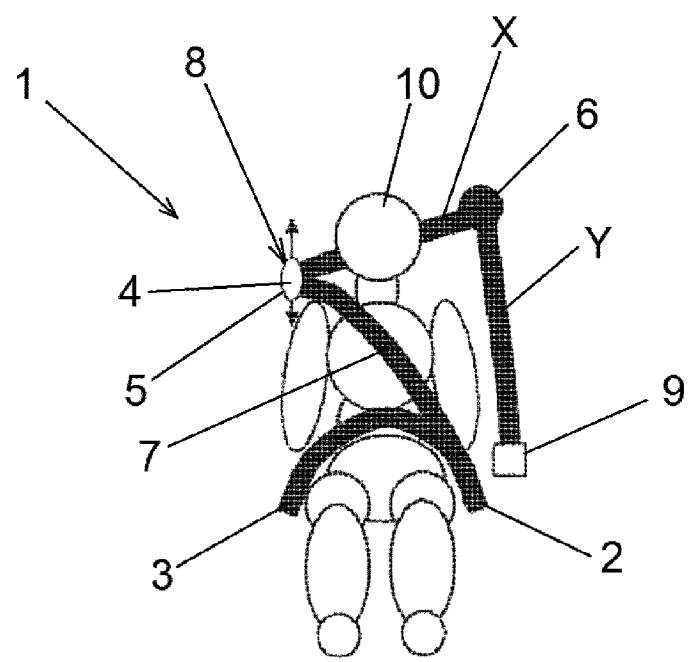
FIG. 1 is a schematic view of a safety belt system according to the prior art.
Figure 2:
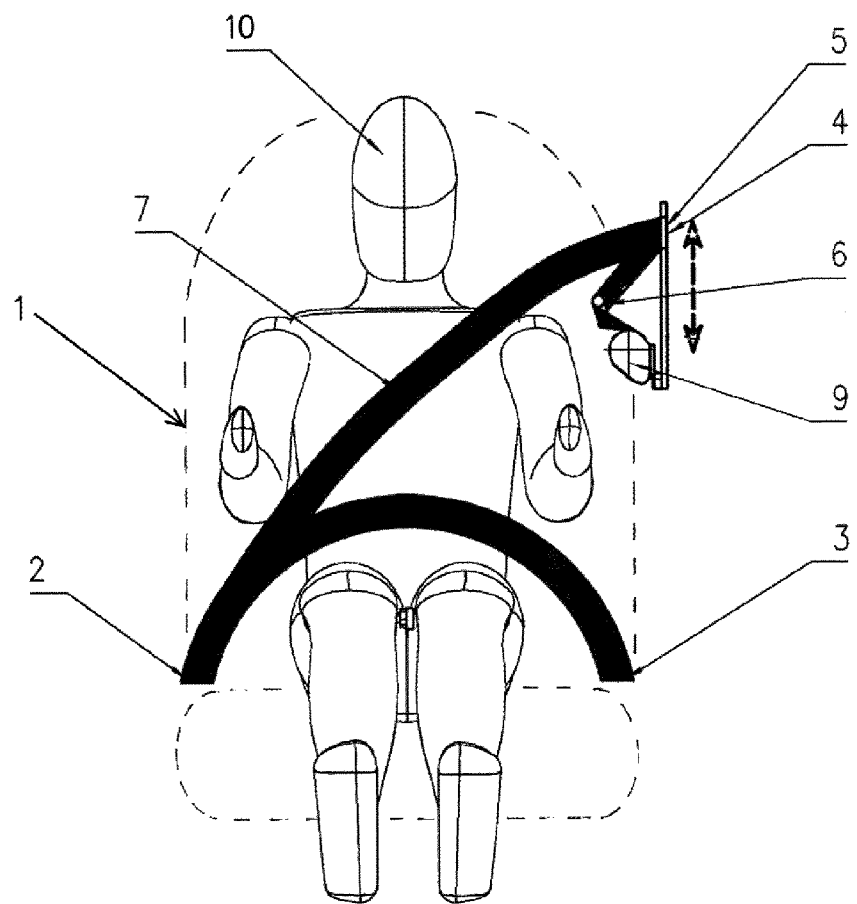
FIG. 2 is a schematic front view of a passenger sitting on the seat of the invention with safety belt fastened.

Referring to FIG. 2, the seat of the invention comprises a safety belt system comprising:
- a safety belt (7) diagonally located across the chest of the passenger (10);
- a recoil and restraint device (9);
- two lower anchor points (2 and 3) located on the two sides of a seat (1);
- a first deflection point (4) for the belt (7) located at the shoulder height of the passenger (10);
- a second deflection point (6) fixed and located behind the back of the passenger (10);
- a height adjustment device (5) adapted to redirect the safety belt (7) from one of the lower anchor points (2 or 3) to said recoil and restraint device (9).

The recoil and restraint device (9) supplies the safety belt (7) and keeps it tight in normal conditions.

The safety belt (7) is diagonally positioned across the chest of the passenger (10) between the first deflection point (4) and one of the lower anchor points (2 or 3) and is transversally located onto the lower part of the passenger's body between the lower anchor points (2 or 3).

Referring now to FIGS. 3, 3A, 4, and 4A, the recoil and restraint device (9) is located in the seat-back on the same side as the height adjustment device (5).

Said recoil and restraint device (9) is provided with recoil axis substantially perpendicular to the seat-back. Therefore, when the seat-back is arranged on a substantially vertical plane, the axis of the recoil and restraint device (9) is a horizontal axis.

The second deflection point (6) is located above the recoil and restraint device (9). The second deflection point (6) comprises a rod with sliding reel. The axis of the rod is the axis of rotation of the reel. The axis of the rod of the second deflection point (6) is perpendicular to the plane of the seat-back. Therefore, when the seat-back is arranged on a substantially vertical plane, the axis of the recoil and restraint device (9) is a horizontal axis.

The belt (7) slides on said reel, coming out of the recoil and restraint device (9), and is redirected to the height adjustment device (5). Therefore the second deflection point (6) is located on the same side of the seat-back wherein the recoil and restraint device (9), the height adjustment device (5) and the first deflection point (4) are arranged.

The height adjustment device (5) comprises a curved vertical rod with concavity facing towards the back of the seat. The rod of the height adjustment device is fixed to the seat framework with fixing means, such as screws and bolts, located at the two lower and upper ends of the rod of the height adjustment device.

The safety belt (7) coming out of the reel of the horizontal rod of the second deflection point (6) is partially recoiled around said curved vertical rod of the height adjustment device (5), thus originating the first deflection point (4), which is displaced freely, redirecting the belt (7) from a variable height that is automatically adjusted to the passenger's needs.

Figure 5:
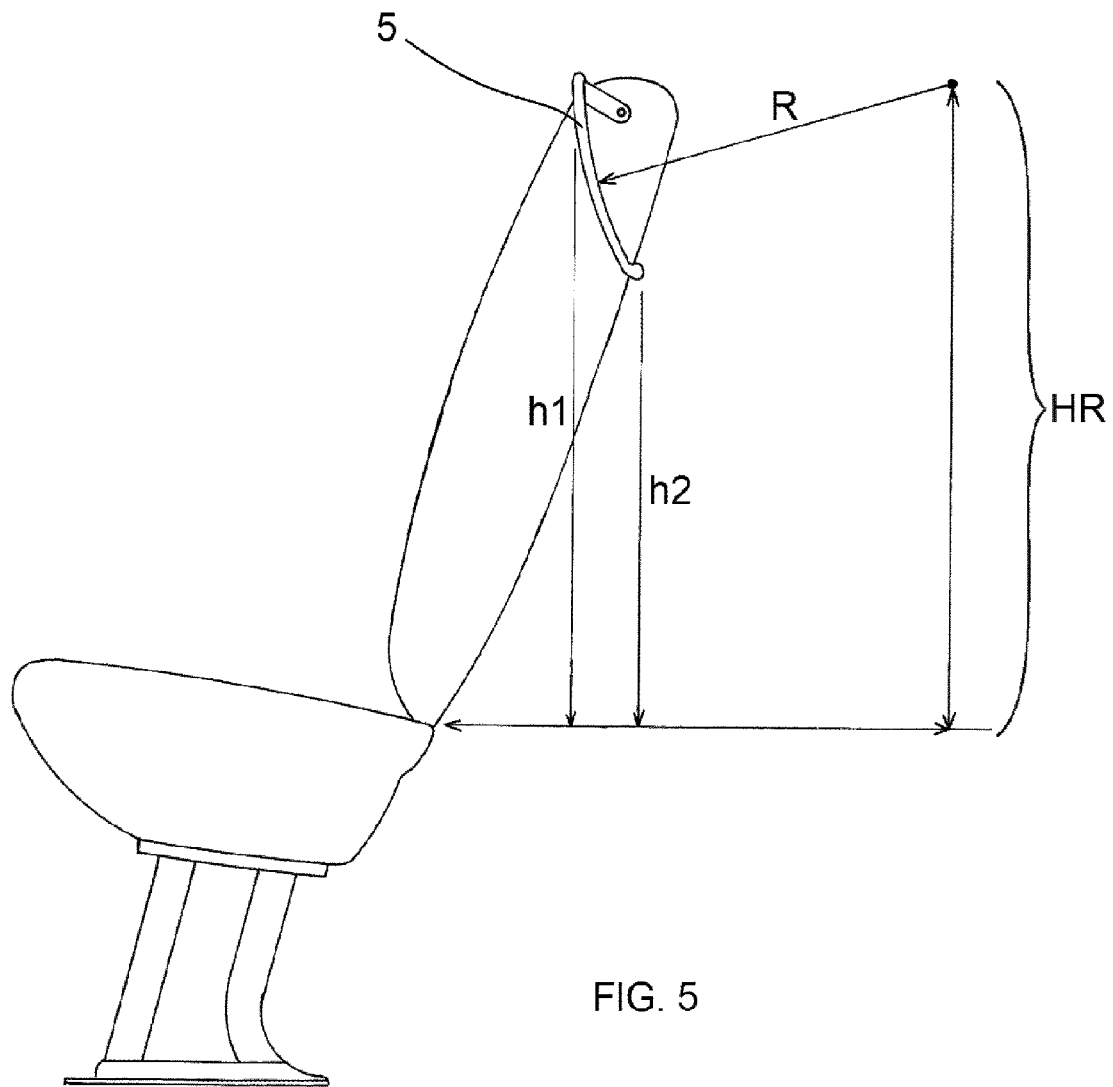
FIG. 5 is a schematic side view that shows the location of the automatic height adjustment device.

Referring to FIG. 5, said vertical rod of the height adjustment device (5) has length of approximately 7.87 inches and radius of curvature of 15.75 inches±0.79 inches.

FIG. 5 shows that the lower point of said vertical rod of the height adjustment device (5) is located at height (h1) of approximately 17.72 inches from the base of the seat-back (with reference to the front side where the passenger rests his/her back), whereas the upper point of said vertical rod of the height adjustment device (5) is located at height (h2) of approximately 25.59 inches from the base of the seat-back.

Instead, the center of said radius of curvature is located at height HR of 24.80 inches±0.79 inches from the base of the seat-back.

The invention claimed is:

1. A safety apparatus for use in a vehicle comprising:
a seat having a seat back;
a safety belt adapted to extend longitudinally across a chest of a passenger in a vehicle;
a recoil and restraint device cooperative with said safety belt so as to supply said safety belt and to keep said safety belt tight, said recoil and restraint device being arranged on one side of said seat back;
a pair of anchor points located on opposite sides of said seat;
a first deflection point for said safety belt located on said one side of said seat above said recoil and restraint device;
a height adjustment device adapted to redirect said safety belt from one of said pair of anchor points toward said recoil and restraint device, said height adjustment device located on said one side of said seat; and
a second deflection point fixed and located behind said seat back, said second deflection point interposed between said first deflection point and said height adjustment device, said recoil and restraint device and said first and second deflection points and said height adjustment device all being on said one side of seat back, said second deflection point comprising a rod with a sliding reel having an axis perpendicular to a plane of said seat back, said recoil and restraint device having a recoil axis substantially perpendicular to said plane of said seat back.

2. The safety apparatus of claim 1, said recoil and restraint device positioned at a level lower than a level of said second deflection point.

3. The safety apparatus of claim 1, said height adjustment device comprising a curved vertical rod having a concavity facing toward a back of said seat.

4. The safety apparatus of claim 3, said curved vertical rod having a length of approximately 7.87 inches and a radius of curvature of 15.75 inches.

5. The safety apparatus of claim 3, said curved vertical rod having a lower end spaced by 17.72 inches from a bottom of said seat back and an upper end spaced by approximately 25.60 inches with respect to the bottom of said seat back.

6. The safety apparatus of claim 3, said curved vertical rod having a radius of curvature from a center point, the center point being located approximately 24.8 inches from a bottom of said seat back.

7. The safety apparatus of claim 3, said curved vertical rod having a fixing device located at lower and upper ends of said curved vertical rod so as to fix to a framework of said seat back, said fixing device comprising screws and bolts arranged at the lower and upper ends of said curved vertical rod.

8. The safety apparatus of claim 7, said recoil and restraint device being fixed to said lower end of said curved vertical rod.

* * * * *